(12) United States Patent
Chen

(10) Patent No.: US 12,109,739 B1
(45) Date of Patent: Oct. 8, 2024

(54) FOOD HEATING MAT MANUFACTURING PROCESS

(71) Applicant: Fang Chen, Hubei (CN)

(72) Inventor: Fang Chen, Hubei (CN)

( * ) Notice: Subject to any disclaimer, the term of this patent is extended or adjusted under 35 U.S.C. 154(b) by 0 days.

(21) Appl. No.: 18/731,210

(22) Filed: May 31, 2024

(51) Int. Cl.
| | |
|---|---|
| *B29C 43/18* | (2006.01) |
| *B29C 43/00* | (2006.01) |
| *B29C 43/58* | (2006.01) |
| B29K 83/00 | (2006.01) |
| B29K 505/02 | (2006.01) |
| B29L 31/00 | (2006.01) |

(52) U.S. Cl.
CPC ............ *B29C 43/18* (2013.01); *B29C 43/003* (2013.01); *B29C 43/58* (2013.01); *B29C 2043/181* (2013.01); *B29C 2043/185* (2013.01); *B29C 2043/5808* (2013.01); *B29C 2043/5816* (2013.01); *B29K 2083/00* (2013.01); *B29K 2505/02* (2013.01); *B29K 2715/006* (2013.01); *B29K 2995/002* (2013.01); *B29K 2995/0097* (2013.01); *B29L 2031/779* (2013.01)

(58) Field of Classification Search
CPC ....... B29C 43/003; B29C 43/14; B29C 43/18; B29C 43/58; B29C 2043/181; B29C 2043/189; B29C 2043/5808; B29C 2043/5816
See application file for complete search history.

(56) References Cited

U.S. PATENT DOCUMENTS

| | | | | |
|---|---|---|---|---|
| 2,077,508 | A * | 4/1937 | Bierer ..................... | B29C 59/04 264/339 |
| 8,383,995 | B2 * | 2/2013 | Gabbay ................... | H05B 3/74 219/544 |
| 2003/0044631 | A1 * | 3/2003 | Sagal .................. | B29C 45/0013 428/560 |
| 2008/0245784 | A1 * | 10/2008 | Lawrence ................ | H05B 3/68 29/592.1 |
| 2009/0166920 | A1 * | 7/2009 | Tokunou ............ | B29C 45/7312 264/219 |

* cited by examiner

*Primary Examiner* — Thu Khan T. Nguyen
(74) *Attorney, Agent, or Firm* — Hawaii Patent Services; Nathaniel K. Fedde; Kenton N. Fedde

(57) ABSTRACT

A food heating mat manufacturing process comprises the following steps: 1. manufacturing silicone layers; 2. treating a heating film; 3. combining the silicone layers and the heating film to form a mat body; 4. integrally molding the mat body at high temperature and high pressure; 5. assembling a food heating mat; and 6. testing the food heating mat; wherein in Step 1, the silicone layers are cut to a predetermined size.

15 Claims, 2 Drawing Sheets

A

FOOD HEATING MAT MANUFACTURING PROCESS

BACKGROUND OF THE INVENTION

1. Technical Field

The invention relates to the technical field of heating mats, in particular to a food heating mat manufacturing process.

2. Description of Related Art

Food heating mat is a utensil used for keeping food warm, which is usually made of materials with good heat conduction, such as metal or ceramic. The working principle of the food heating mat is to heat food with heating components, so as to slow down the cooling process of the food, thus achieving the goal of heat preservation. This type of utensil is typically used in combination with dining tables, where already cooled food can be placed on the food heating mat to be reheated and kept warm. The food heating mat is a convenient and practical kitchen tool, especially suitable for winter or situations that require long-term heat preservation.

In the prior art, the manufacturing process of the food heating mat involves heating with a heating wire, resulting in uneven heating and large temperature difference in certain areas; furthermore, the manufacturing process employs adhesive to bond two silicone layers, which can lead to blistering and edge curling during heating.

Consequently, there is a need to introduce a novel food heating mat manufacturing process that utilizes a heating film for uniform heating without temperature difference. By employing high-temperature and high-pressure molding of silicone, silicone layers can tightly encase the heating film, thereby avoiding blistering and edge curling during heating.

BRIEF SUMMARY OF THE INVENTION

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various embodiments of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

The invention provides a food heating mat manufacturing process to solve the problems of difficult storage and low waterproofing performance associated with existing food heating mats as mentioned in the above background art.

To achieve the above objective, the invention adopts the following technical scheme.

A food heating mat manufacturing process comprises the following steps:

Step 1. manufacturing silicone layers;
Step 2. treating a heating film;
Step 3. combining the silicone layers and the heating film to form a mat body;
Step 4. integrally molding the mat body at high temperature and high pressure;
Step 5. assembling a food heating mat; and
Step 6. testing the food heating mat;
wherein in Step 1, the silicone layers are cut to a predetermined size;
in Step 2, a surface of the heating film is uniformly coated with a treating agent, and then the heating film coated with the treating agent is baked;
in Step 3, the heating film is bonded between the two silicone layers;
in Step 4, the combined mat body is put into an inner cavity of a die and subjected to high temperature and high pressure for molding; and
in Step 5, a temperature control probe is placed in the mat, and a controller is installed.

BRIEF DESCRIPTION OF THE SEVERAL VIEWS OF THE DRAWINGS

In order to explain the technical scheme of this application more clearly, the drawings needed in the implementation will be briefly introduced below. Obviously, the drawings described below are only some implementations of this application. For those skilled in the art, other drawings can be obtained according to these drawings without creative work.

DETAILED DESCRIPTION OF THE INVENTION

In describing the preferred embodiments, specific terminology will be resorted to for the sake of clarity. It is to be understood that each specific term includes all technical equivalents which operate in a similar manner to accomplish a similar purpose.

While various aspects and features of certain embodiments have been summarized above, the following detailed description illustrates a few exemplary embodiments in further detail to enable one skilled in the art to practice such embodiments. Reference will now be made in detail to embodiments of the inventive concept, examples of which are illustrated in the accompanying drawings. The accompanying drawings are not necessarily drawn to scale. The described examples are provided for illustrative purposes and are not intended to limit the scope of the invention. It should be understood, however, that persons having ordinary skill in the art may practice the inventive concept without these specific details.

It will be understood that, although the terms first, second, etc. may be used herein to describe various elements, these elements should not be limited by these terms. These terms are only used to distinguish one element from another. For example, a first attachment could be termed a second attachment, and, similarly, a second attachment could be termed a first attachment, without departing from the scope of the inventive concept.

It will be understood that when an element or layer is referred to as being "on," "coupled to," or "connected to" another element or layer, it can be directly on, directly coupled to or directly connected to the other element or layer, or intervening elements or layers may be present. In contrast, when an element is referred to as being "directly on," "directly coupled to," or "directly connected to" another element or layer, there are no intervening elements or layers present. Like numbers refer to like elements throughout. As used herein, the term "and/or" includes any and all combinations of one or more of the associated listed items.

As used in the description of the inventive concept and the appended claims, the singular forms "a," "an," and "the" are intended to include the plural forms as well, unless the context clearly indicates other.

Figure 1:
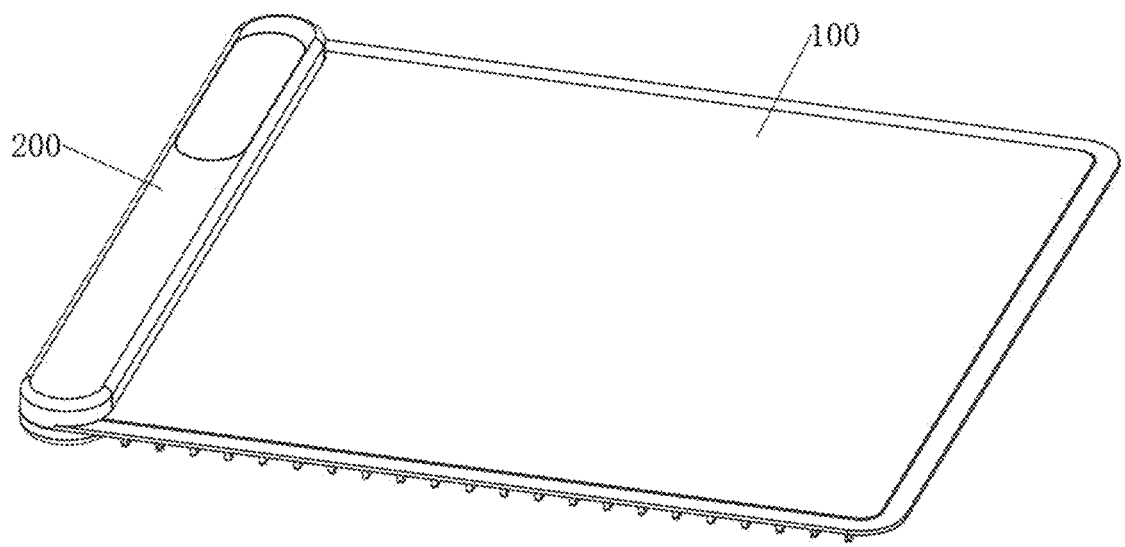
FIG. 1 is a structural diagram of the invention.
Figure 2:
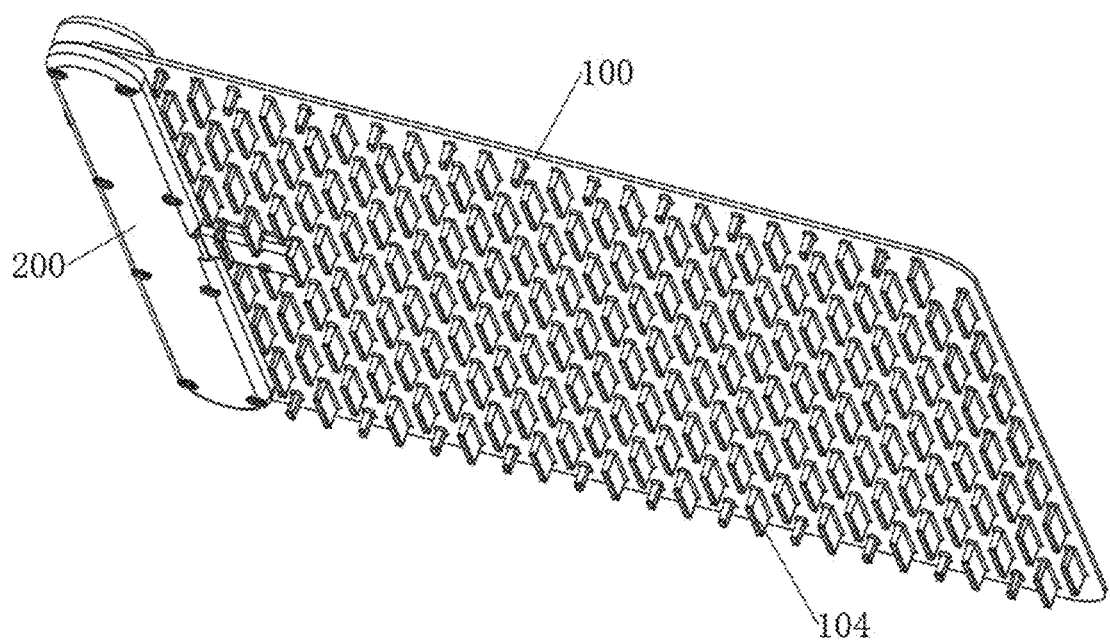
FIG. 2 is a structural diagram of the invention from another angle.
Figure 3:
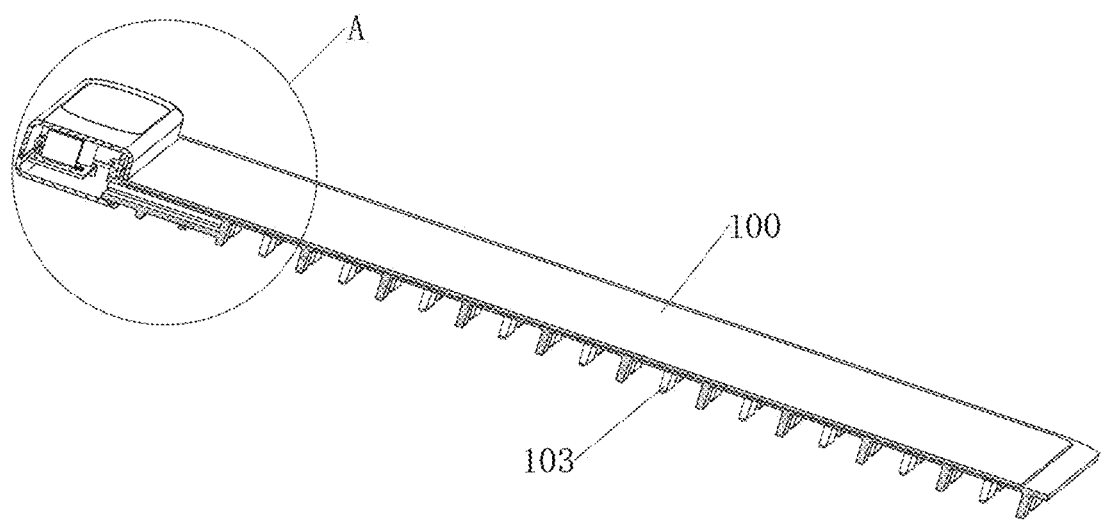
FIG. 3 is a section view of the invention.
Figure 4:
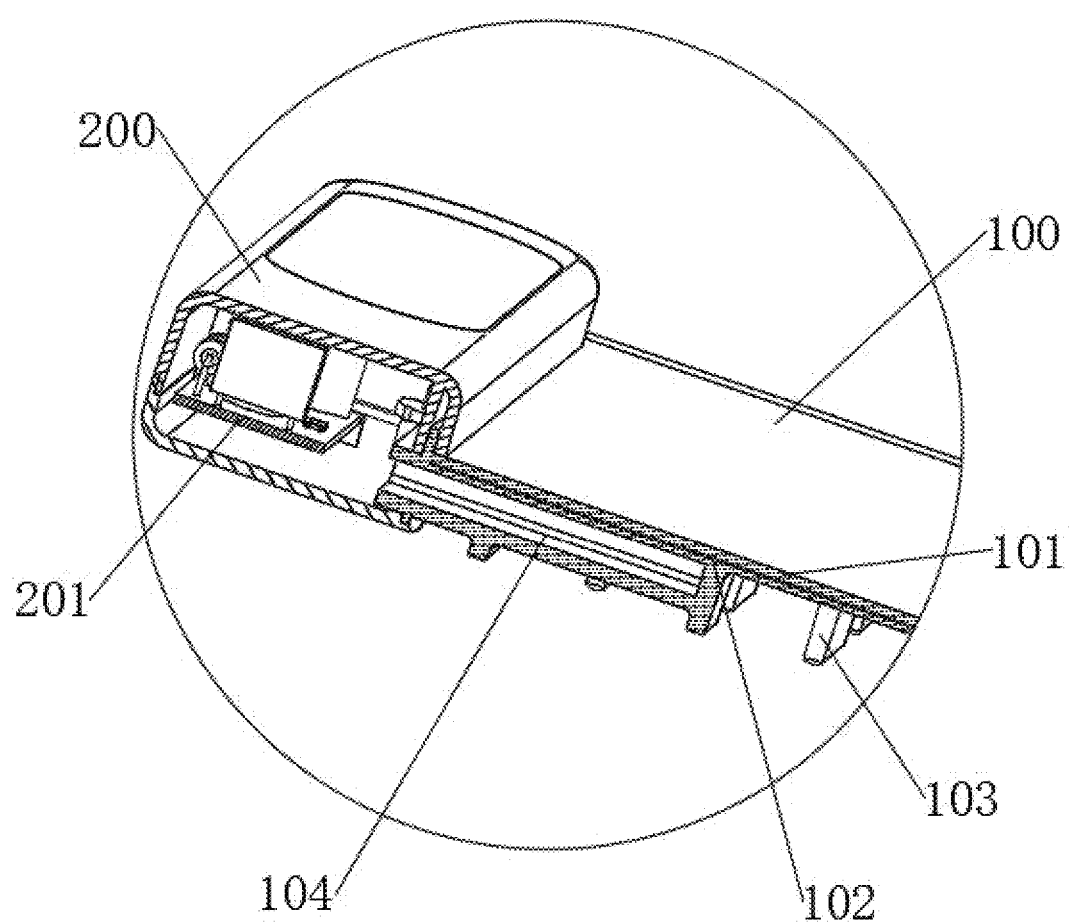
FIG. 4 is a partially enlarged view of part A in FIG. 3.
In the drawings: mat body (100); silicone layer (101); heating film (102); heat-proof boss (103); reserved groove (104); temperature controller (200); circuit board (201).

Refer to FIGS. 1-4.

The invention provides a food heating mat manufacturing process which comprises the following steps.

In Step 1, silicone layers 101 are manufactured.

The silicone layer 101 utilizes food-grade silicone as a raw material, followed by the addition of a color master batch and a vulcanizing agent for blending, stirring, and coloring. After being prepared, silicone is rolled into sheets by using a rolling machine. After the silicone is rolled into sheets, a cutting machine is used to cut the silicone into silicone layers 101 measuring 40 cm*60 cm.

Further, the size of the silicone layer 101 is not limited to the above size, and the cutting size can be adjusted according to the actual production needs, so as to obtain food heating mats of different sizes.

In Step 2, a heating film 102 is treated.

A surface of the heating film 102 is uniformly coated with a treating agent which is glue, and then the heating film 102 coated with the treating agent is baked; before the heating film 102 is coated with the treating agent, the surface of the heating film 102 is cleaned with alcohol to remove grease and dust; and the heating film 102 is baked in an oven at 110° C. for 20 min.

By using the heating film 102 for heating, the heating temperature is uniform without temperature difference.

In Step 3, the silicone layers 101 and the heating film 102 are combined to form a mat body 100.

The heating film 102 is bonded between the two silicone layers 101; and when the mat body 100 is formed by combining the silicone layers 101 and the heating film 102, the silicone layer 101 at an electrode plate of the heating film 102 is removed with a tool to expose the electrode plate.

In Step 4, the mat body 100 is integrally molded at high temperature and high pressure.

A molding die corresponding to the mat body 100 is prepared in advance, and the molding die comprises a molding cavity with heat-proof bosses 103 and a reserved groove 104; then the combined mat body 100 is put into an inner cavity of the die and subjected to high temperature and high pressure for molding; when the mat body 100 is molded at high temperature and high pressure, the temperature is 130° C., the pressure is 180 kpa, and the duration is 300 s; during the high-temperature and high-pressure molding process of the mat body 100, the lower silicone layer 101 becomes a flowable state due to high temperature and flows into recesses of the heat-proof bosses 103 of the die, and the reserved groove 104 for installing the temperature control probe is preset in the silicone layer 101; after the mat body 100 is cooled, the two silicone layers 101 are integrated to encase the heating film 102, and the plurality of heat-proof bosses 103 are formed on a bottom of the lower silicone layer 101; and after the mat body 100 is molded, the molded mat body 100 is trimmed, deburred and cleaned to make a surface of the mat body 100 smooth and flat.

By employing high-temperature and high-pressure molding of silicone, the silicone layers 101 can tightly encase the heating film 102, thereby avoiding blistering and edge curling during heating.

In Step 5, a food heating mat is assembled.

The temperature control probe is placed in the mat, and a controller is installed; when the food heating mat is assembled, the temperature control probe is put into the preset reserved groove 104 of the silicone layer 101 and attached to the silicone layer 101; after the temperature control probe is installed, a mixed liquid of alumina and potting adhesive is injected into the preset reserved groove 104 for encapsulation; and when the food heating mat is assembled, a connecting wire of a circuit board 201 in a controller is electrically connected with the electrode plate of the heating film 102, and the circuit board 201 is connected with a control panel on the controller.

In Step 6, the food heating mat is tested.

Testing the food heating mat involves checking if the temperature controller 200 and the heating film 102 are powered on and whether the heating film 102 heats up after being powered on.

The technical means disclosed in the scheme of the present invention are not limited to the technical means disclosed in the above embodiments, but also include the technical scheme composed of any combination of the above technical features. It should be pointed out that for those skilled in the art, several improvements and embellishments can be made without departing from the principle of the present invention, and these improvements and embellishments are also regarded as the protection scope of the present invention.

The invention has now been described in detail for the purposes of clarity and understanding. However, those skilled in the art will appreciate that certain changes and modifications may be practiced within the scope of the appended claims.

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, and/or steps. Thus, such conditional language is not generally intended to imply that features, elements and/or steps are in any way required for one or more examples or that one or more examples necessarily include logic for deciding, with or without author input or prompting, whether these features, elements and/or steps are included or are to be performed in any particular example.

The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Similarly, the use of "based at least in part on" is meant to be open and inclusive, in that a process, step, calculation, or other action "based at least in part on" one or more recited conditions or values may, in practice, be based on additional conditions or values beyond those recited. Headings, lists, and numbering included herein are for ease of explanation only and are not meant to be limiting.

The various features and processes described above may be used independently of one another, or may be combined in various ways. All possible combinations and sub-combinations are intended to fall within the scope of the present disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed examples. Similarly, the example systems and components described herein may be configured differently than described. For example, elements may be added to, removed from, or rearranged compared to the disclosed examples.

What is claimed is:

1. A food heating mat manufacturing process, comprising the following steps:
   Step 1: manufacturing silicone layers by cutting the silicon layers into a predetermined size;
   Step 2: treating a heating film by cleaning a surface of the heating film, uniformly coating the surface of the heating film with a treating agent, and then baking the heating film coated with the treating agent;
   Step 3: combining the silicone layers and the heating film to form a mat body by bonding the heating film in between two silicone layers;
   Step 4: placing the mat body into an inner cavity of a die, and molding the mat body at a temperature of at least 110° C. and a pressure of at least 180 KPa;
   Step 5: assembling a food heating mat, placing a temperature control probe in the mat, and installing a controller; and
   Step 6: testing the food heating mat.

2. The food heating mat manufacturing process according to claim 1, wherein the silicone layers utilizes food-grade silicone as a raw material, followed by an addition of a color master batch and a vulcanizing agent for blending, stirring, and coloring.

3. The food heating mat manufacturing process according to claim 2, wherein after being prepared, silicone layers are rolled into sheets by using a rolling machine.

4. The food heating mat manufacturing process according to claim 3, wherein after the food-grade silicone is rolled into sheets, a cutting machine is used to cut the food-grade silicone into silicone layers measuring 40 cm×60 cm.

5. The food heating mat manufacturing process according to claim 1, wherein before the heating film is coated with the treating agent, the surface of the heating film is cleaned with alcohol to remove grease and dust.

6. The food heating mat manufacturing process according to claim 1, wherein the heating film is baked in an oven at 110° C. for 20 minutes.

7. The food heating mat manufacturing process according to claim 1, wherein when the mat body is formed by combining the silicone layers and the heating film, wherein the silicone layers at an electrode plate of the heating film is removed with a tool to expose the electrode plate.

8. The food heating mat manufacturing process according to claim 1, wherein when the mat body is molded at temperature is of at least 130° C., the pressure is of at least 180 KPa, and the duration is 300 s.

9. The food heating mat manufacturing process according to claim 1, wherein during the molding process of the mat body, a lower silicone layer, of the silicone layers, becomes a flowable state and flows into recesses of heat-proof bosses of the die, and a reserved groove for installing the temperature control probe is preset in the lower silicone layer.

10. The food heating mat manufacturing process according to claim 9, wherein after the mat body is cooled, the two silicone layers are integrated to encase the heating film, and the plurality of heat-proof bosses are formed on a bottom of the lower silicone layer.

11. The food heating mat manufacturing process according to claim 10, wherein after the mat body is molded, the molded mat body is trimmed, deburred and cleaned to make a surface of the mat body smooth and flat.

12. The food heating mat manufacturing process according to claim 9, wherein when the food heating mat is assembled, the temperature control probe is put into a preset reserved groove of the silicone layers and attached to the silicone layers.

13. The food heating mat manufacturing process according to claim 12, wherein after the temperature control probe is installed, a mixed liquid of alumina and potting adhesive is injected into the preset reserved groove for encapsulation.

14. The food heating mat manufacturing process according to claim 7, wherein when the food heating mat is assembled, a connecting wire of a circuit board in the controller is electrically connected with the electrode plate of the heating film, and the circuit board is connected with a control panel on the controller electrically connected with the electrode plate.

15. The food heating mat manufacturing process according to claim 14, wherein the testing the food heating mat involves checking if the food heating mat is powered on and whether the heating film heats up after being powered on.

* * * * *